United States Patent
Kim

(10) Patent No.: US 10,378,863 B2
(45) Date of Patent: Aug. 13, 2019

(54) SMART WEARABLE MINE DETECTOR

(71) Applicant: Seoul National University of Technology Center for Industry Collaboration, Seoul (KR)

(72) Inventor: Chiwook Kim, Seoul (KR)

(73) Assignee: Seoul National University of Technology Center for Industry Collaboration (KR)

(*) Notice: Subject to any disclaimer, the term of this patent is extended or adjusted under 35 U.S.C. 154(b) by 386 days.

(21) Appl. No.: 15/305,658

(22) PCT Filed: Apr. 17, 2015

(86) PCT No.: PCT/KR2015/003901
§ 371 (c)(1),
(2) Date: Oct. 20, 2016

(87) PCT Pub. No.: WO2015/163648
PCT Pub. Date: Oct. 29, 2015

(65) Prior Publication Data
US 2017/0045337 A1  Feb. 16, 2017

(30) Foreign Application Priority Data

Apr. 21, 2014 (KR) .......... 10-2014-0047362
Apr. 21, 2014 (KR) .......... 10-2014-0047363

(51) Int. Cl.
*F41H 11/136* (2011.01)
*G01V 3/08* (2006.01)
(Continued)

(52) U.S. Cl.
CPC .......... *F41H 11/136* (2013.01); *G01T 3/00* (2013.01); *G01T 7/00* (2013.01); *G01V 3/08* (2013.01);
(Continued)

(58) Field of Classification Search
CPC ........ F41H 11/136; G01V 3/08; G01V 3/083; G01V 5/0008; G01V 2003/084; G01T 3/00; G01T 7/00
(Continued)

(56) References Cited

U.S. PATENT DOCUMENTS

2008/0106454 A1* 5/2008 Danilov .......... G01S 13/04
342/22
2010/0052971 A1* 3/2010 Amarillas .......... G01S 13/885
342/22

FOREIGN PATENT DOCUMENTS

JP    3768101 B2   2/2006
KR    101252483 B1 4/2013
KR    20130106949 A 10/2013

OTHER PUBLICATIONS

English Translation of Lee et al., KR101252483B1, (Year: 2013).*
(Continued)

*Primary Examiner* — Frank J McGue
(74) *Attorney, Agent, or Firm* — Renaissance IP Law Group LLP

(57) ABSTRACT

To improve the problems of conventional mine detectors, the purpose of the present invention is to provide a smart wearable mine detector comprising a human body antenna unit 100, a main microprocessor unit 200, a smart eyeglasses unit 300, a body-mounted LCD monitor unit 400, a wireless data transmission and reception unit 500, a belt-type power supply unit 600, a black box-type camera unit 700, and a security communication headset 800, the smart wearable mine detector: can be detachably worn on the head, torso, arm, waist, leg and the like of a body while a combat uniform is worn, thereby having excellent compatibility with conventional combat uniforms; enables a human body antenna unit which is detachably attached to a body and detects a mine through a super high-frequency RF beam and a neutron technique to be applied so as to detect the mine by identifying metals, nonmetals, and initial explosives of the mine; enables mines buried on the ground and under the ground to be detected in all directions (360°), and a distance, location, form, and materials of the mines to be exhibited on smart eyeglasses and a body-mounted LCD monitor unit in (Continued)

real time as 2D or 3D images such that a combatant can engage in battle avoiding mines, thereby improving combat efficiency by 90% when compared to existing combat efficiency; enables a battle to be carried out for three to seven days through a twin self-power supply system of a portable battery and a belt-type power supply unit even without need for charging power; and enables combat situations in a remote place to be monitored, in real time, in a remote combat command server, and allows each combatant to share combat information one to one such that it is possible to construct a smart combat command system capable of remotely commanding real combat situations as if one was on site of the battle.

6 Claims, 13 Drawing Sheets

(51) Int. Cl.
　　　*G01V 5/00*　　　(2006.01)
　　　*G01T 3/00*　　　(2006.01)
　　　*G01T 7/00*　　　(2006.01)

(52) U.S. Cl.
　　　CPC ............ *G01V 3/083* (2013.01); *G01V 5/0008* (2013.01); *G01V 2003/084* (2013.01)

(58) Field of Classification Search
　　　USPC .......................................................... 342/22
　　　See application file for complete search history.

(56) References Cited

OTHER PUBLICATIONS

English Translation of Omron Corp., JP3768101 B2 (Year: 2006).*
English Translation of Kim et al., KR102013010649 (Year: 2013).*
Kim, Chi-Wook, "A Study on Analysis and Improvement of Current Korean Army's Mine Detector", The Journal of The Institute of Internet, Broadcasting and Communication, vol. 13, No. 5, Oct. 2013, 6 pages.

* cited by examiner

SMART WEARABLE MINE DETECTOR

TECHNICAL FIELD

The present invention relates to a smart wearable mine detector which is detachably attached to the body and which allows a combatant to engage in battle avoiding mines and can improve combat efficiency of 90% compared to existing combat efficiency because mines on the ground and buried underground can be detected in all directions (360°) by applying a human body antenna unit for detecting a mine through a super high-frequency RF beam and a neutron technique.

BACKGROUND ART

Today, one hundred and twenty million mines are sprayed 64 countries all over the worlds. Ten thousand or more hurt their arms and legs each year.

A significant detection and removal technology for mines buried underground is insufficient. Conventional methods using a metal detector and a probe used in the First World War are still used without any change on the site.

Accordingly, a lot of interest has only recently been focused on a technology for detecting and removing mines, so research and development have been being carried out on the technology. Major mine detection sensor technologies that are commercialized and used in Korea and other counties include a metal detector, ground penetration radar, infrared detection, an electromagnetic induction method, a neutron method, nuclear quadrupole resonance, a chemical and biological detection method and so on.

Furthermore, a mine detector is divided into a portable mine detector and a vehicle type mine detector depending on the detection method. In the vehicle type mine detector, unlike in the portable mine detector, a person does not directly detect a mine using the vehicle type mine detector, but the vehicle type mine detector is mounted on a robot or a vehicle and detects a mine. Accordingly, the damage occurring in the process of detecting a mine can be minimized.

However, most of mine burial landforms include areas in which detection equipment for a robot or a vehicle cannot be used, such as wooded mountainous areas, rocks, sand, soil, an open area, and a wood. Accordingly, in many sites, a person has to directly detect a mine using a portable detector.

In particular, if a mine is to be detected in mountains with many rocks and gravels or damp grounds such as rice fields and rivers, many weaknesses, such as a low detection probability and a high Constant False Alarm Rate (CFAR), are generated.

In order to solve such problems, Korean Patent No. 10-1329090 that is a prior patent has suggested Portable Mine Detection Device Using Motion Capture, The Method. The prior patent provides a method to detect a mine through voice, coordinate marks, and coordinate signal images in peace other than in battle because it includes a marking unit, a photographing unit, and a measuring unit, so cannot be used in an actual battle situation.

As another prior patent, Korean Patent No. 10-1348989 has suggested Mine Detector Detachable and Attachable To Military Shoes. The prior patent discloses a detection unit for mine detection configured in combat shoes and only detects a mine, and does not disclose an element of a recognition device for notifying a combatant of the detection of a mine. The prior patent has problems in that a lot of noise is generated due to soil and alien substances attached to combat shoes and accurate mine detection is difficult.

As described above, the conventional mine detection devices are problematic in that they do not accurately detect a mine or damage is generated because a mine is not immediately removed although the mine is detected.

Furthermore, a lot of manpower and time are wasted because it is impossible to distinguish a place where mine detection was performed from an area where detection was not performed.

In particular, the conventional portable mine detection device is problematic in that a mine is not accurately detected if a user does not move the sensor head unit at a constant speed or moves it too fast.

(Patent Document 1) 1. Korean Patent No. 10-1329090
(Patent Document 2) 2. Korean Patent No. 10-1348989

DISCLOSURE

Technical Problem

In order to solve the problems, an object of the present invention is to provide a smart wearable mine detector which is detachably attached to the body and which can detect a mine identifying the metals, nonmetals, and initial explosives of the mine using a human body antenna unit for detecting a mine through a super high-frequency RF beam and a neutron technique, can detect mines on the ground and buried underground in all directions (360°), can enable a long-time battle even without separate power charging through the twin-self power supply system of a portable battery and a belt-type power supply unit, can enable a remote battle command server to monitor a combatant situation in a remote place in real time, can enable combatants to share combatant information in a one-to-one manner, thereby enabling a smart battle command system capable of remotely commanding a realistic combatant situation, such as in a combat site, to be constructed.

Technical Solution

In order to accomplish the above object, a smart wearable mine detector according to the present invention includes a human body antenna unit 100 detachably installed on a body of a combatant, for detecting a mine through a super high-frequency RF beam and a neutron technique, a main microprocessor unit 200 for controlling an overall operation of each element, and a smart glasses unit 300 worn on an eye of the combatant, for displaying 2D/3D display data of the distance, location, form, and material of the mine and GPS location information data received from the main microprocessor unit 200 and a special mission command signal transmitted from a battle command server on the surface of the glasses.

Advantageous Effects

As described above, the present invention has excellent advantages in that compatibility with an existing combat uniform is excellent because the smart wearable mine detector can be detachably mounted on the head, torso, arm, waist, leg, etc. of a body in the state in which a combat uniform has been worn, the smart wearable mine detector can detect a mine identifying the metals, nonmetals, and initial explosive of the mine by using the human body antenna unit that detects the mine through a super high-frequency RF beam and a neutron technique, the smart wearable mine detector can detect mines on the ground and buried underground in all directions (360°), the smart wearable mine detector can enable a combatant to engage in battle avoiding mines and thus improve combat efficiency by 90% compared to existing combat efficiency because the smart wearable mine detector can display the distances, locations, forms, and materials of corresponding mines on the smart glasses and the body-mounted LCD monitor unit in a 2-D or 3-D image form in real time, the smart wearable mine detector can enable a combatant to engage in battle for 3-7 days even without separate power charging through the twin-self power supply system of the portable battery and the belt-type power supply unit, and a smart battle command system capable of remotely commanding a realistic combatant situation as in a combat site can be constructed because the smart wearable mine detector can enable a remote battle command server to monitor a combatant situation in a remote place in real time, and enable combatants to share combatant information in a one-to-one manner through the smart wearable mine detector.

MODE FOR INVENTION

Hereinafter, preferred embodiments of the present invention are described with reference to the accompanying drawings.

Figure 1:
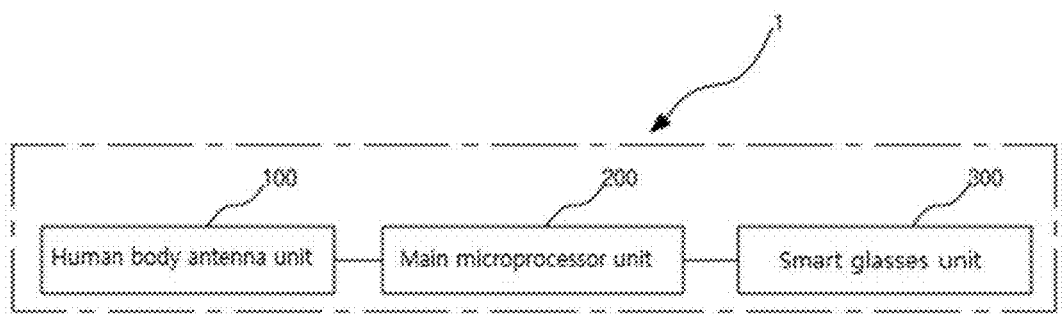
FIG. 1 shows the configuration of the elements of a smart wearable mine detector 1 according to the present invention.

FIG. 1 shows the configuration of the elements of a smart wearable mine detector 1 according to the present invention. In FIG. 1, the smart wearable mine detector is detachably attached to the body of a combatant in the state in which the combatant has worn a combat uniform, detects the metals and nonmetals of mines on the front and sides using a super high-frequency RF beam and the initial explosives of the mines using a neutron technique in all directions of 360°, notifies the combatant of the detection, and sends data in real time so that the combatant engages in battle avoiding the mines.

The smart wearable mine detector 1 includes a human body antenna unit 100, a main microprocessor unit 200, and a smart glasses unit 300.

The human body antenna unit 100 according to the present invention is first described.

The human body antenna unit 100 is detachably installed on the body and functions to detect a mine through a super high-frequency RF beam and a neutron technique.

Figure 2:
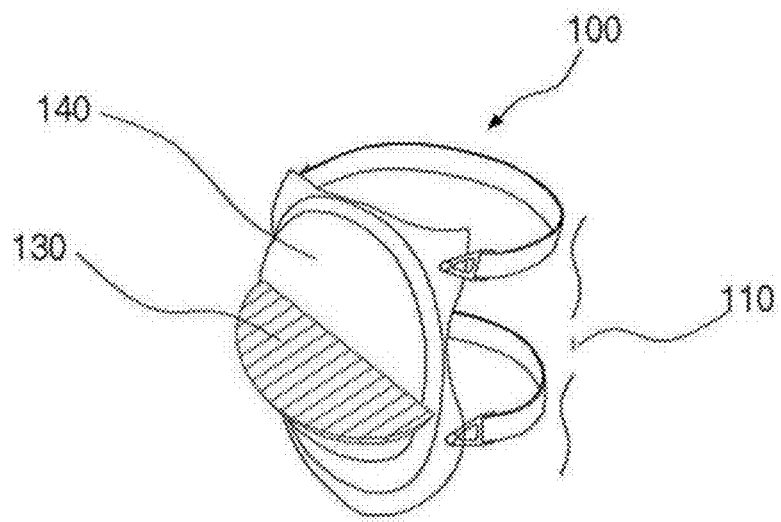
FIG. 2 is a perspective view of the elements of the human body antenna unit of the smart wearable mine detector according to the present invention.
Figure 3:
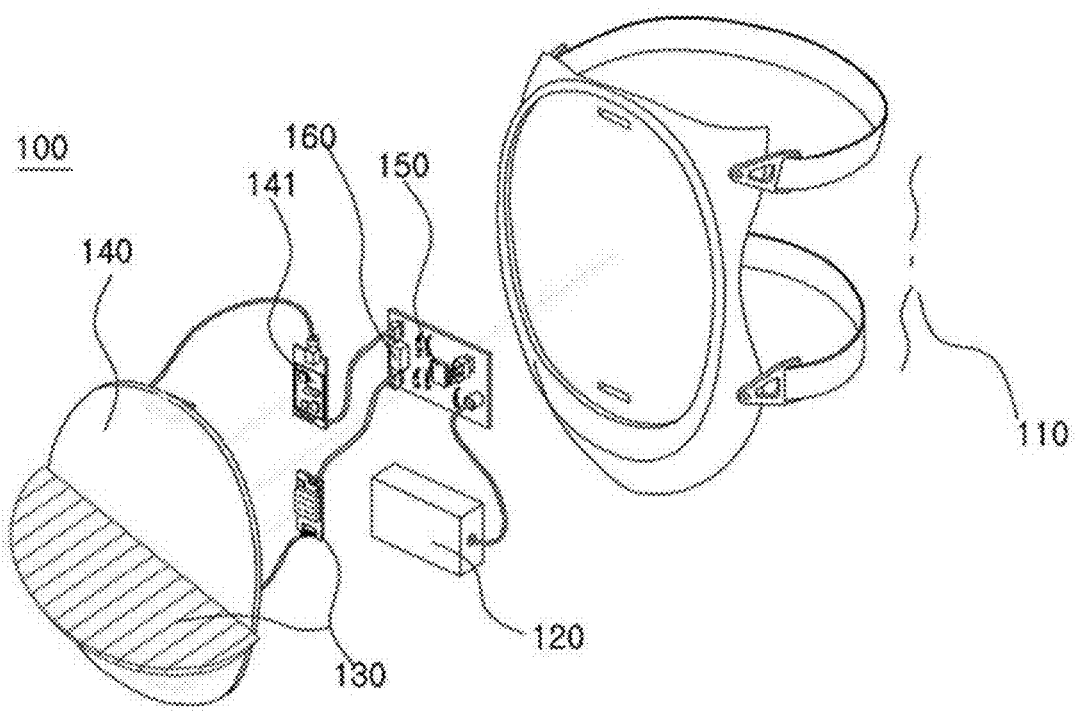
FIG. 3 is an exploded perspective view showing the elements of the human body antenna unit according to the present invention.

As shown in FIGS. 2 and 3, the human body antenna unit 100 includes an antenna body 110, a first battery unit 120, an RF radiation beam transmission antenna unit 130, an RF radiation beam reception antenna unit 140, a ground penetrating radar (GPR) control unit 150, and a first Bluetooth communication module 160.

First, the antenna body 110 according to the present invention is described.

The antenna body 110 is protruded in a circular fan shape and functions to protect and support each element against external pressure.

The antenna body 110 is protruded toward the front and side of a knee in a circular fan shape and configured to radiate an RF radiation beam to the ground at the front and the ground on the sides through the RF radiation beam transmission antenna unit.

The antenna body 110 may be formed with shape memory alloy. The antenna body 110 may be formed with a flexible plastic resin material, and thereby can be bent when a user lies prone toward the RF radiation beam transmission antenna unit.

Second, the first battery unit 120 according to the present invention is described.

The first battery unit 120 is located on one side within the antenna body and functions to supply power to each element.

Figure 4:
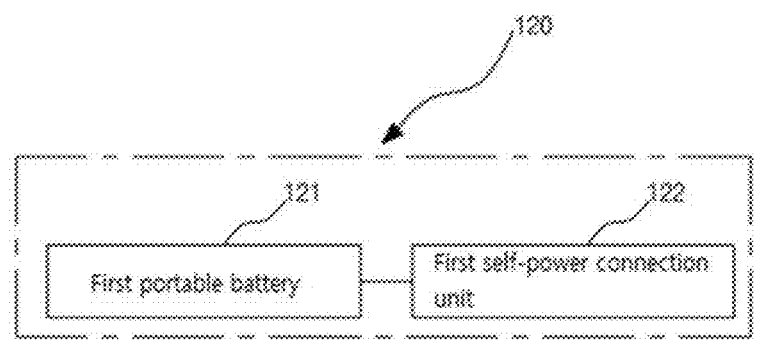
FIG. 4 is a block diagram showing the elements of the first battery unit of the elements of the human body antenna unit according to the present invention.

As shown in FIG. 4, the first battery unit 120 includes a first portable battery 121 and a first self-power connection unit 122.

The first portable battery 121 is formed in a lithium ion battery pack structure and functions to supply main power to each element.

The first self-power connection unit 122 functions to receive emergency self-power in a wired manner through a belt-type power supply unit when the first portable battery is discharged.

Third, the RF radiation beam transmission antenna unit 130 according to the present invention is described.

The RF radiation beam transmission antenna unit 130 is located on the head of the antenna body, applies an electromagnetic flow method of an oscillation frequency bandwidth 300 MHz-500 MHz, sets audible frequency for generation of a mine detection message to 1000 Hz-2000 Hz, and functions to radiate a plurality of super high-frequency RF radiation beams to the ground at the front and the ground on the sides in a flexible loop radiation type antenna structure.

Figure 22:
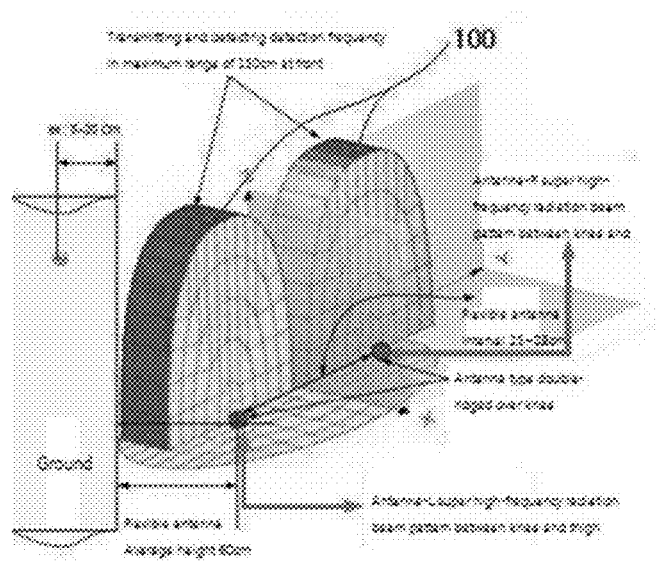
FIG. 22 shows an embodiment showing that a super high-frequency radiation beam pattern has been formed in a double-ridged type and a mine is detected through an RF radiation beam transmission antenna unit according to the present invention.

As shown in FIG. 22, the RF radiation beam transmission antenna unit 130 is installed on both knees of the body and protruded to the front and sides in a circular fan shape, and is configured to detect even a maximum front range of 150 cm and a maximum side range of 30 cm because a super high-frequency radiation beam pattern is formed between a knee and the inside of a thigh in a double-ridged form.

Accordingly, in the present invention, the metals, nonmetals, and initial explosives of mines located in the underground of 5 cm-20 cm from the ground can be detected in real time while moving in the state of an average height of 60 cm from the ground.

Fourth, the RF radiation beam reception antenna unit 140 according to the present invention is described.

The RF radiation beam reception antenna unit 140 functions to detect the signals of RF radiation beam returning by being reflected or scattered from the metals and nonmetals of mines and the signals of neutrons returning by being reflected or scattered from the initial explosives of mines, radiated by the RF radiation beam transmission antenna unit.

The RF radiation beam reception antenna unit 140 is configured to include a pre-processing unit 141 for metal and nonmetal and an initial explosive of the mine.

The pre-processing unit 141 for metal and nonmetal and an initial explosive of the mine functions to pre-process super high-frequency RF radiation beams reflected from metal things, a can, the root of a tree, a stone, and a lump of solid earth, which are objects similar to a mine, and from an initial explosive shape and to remove an error factor in order to select signals of mines and explosives including the metals, nonmetals, and initial explosives of the mines.

Figure 5:
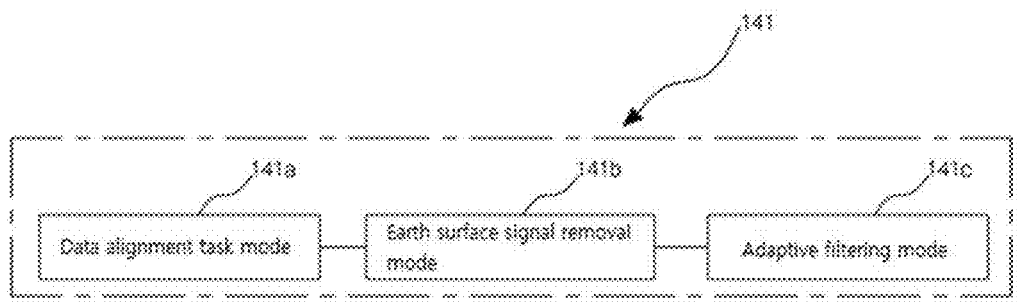
FIG. 5 is a block diagram showing the elements of the metals, nonmetals, and initial explosive pre-processing unit of an RF radiation beam reception antenna unit according to the present invention.

As shown in FIG. 5, the pre-processing unit 141 for metal and nonmetal and an initial explosive of the mine includes a data alignment task mode 141a, an earth surface signal removal mode 141b, and an adaptive filtering mode 141c.

The data alignment task mode 141a functions to form an earth surface signal as a sharp earth surface signal by correcting a phenomenon in which the earth surface signal looks overlapped in several folds when the antenna main body is shaken by an impact during walking.

The data alignment task mode 141a includes a trigger signal unit and a vector analyzer, and assumes values, corresponding to maximum values of 1-dimensional signals transmitted and received by a single sensor, to be an earth surface signal and aligns the values to the same depth.

In this case, the trigger signal unit forms a signal that provides each element with a change of the start of an operation in a waveform of a pulse state.

The vector analyzer functions to align and check super high-frequency RF radiation beam signals returning by being reflected or scattered from the metals, nonmetals, and initial explosives of mines, super high-frequency RF radiation beam signals returning by being reflected or scattered from metal things, a can, the root of a tree, a stone, and a lump of solid earth, which are objects similar to a mine, and the initial explosive of a mine, and earth surface signals.

The earth surface signal removal mode 141b functions to remove aligned earth surface signals by applying a hair cutting method based on the aligned earth surface signals.

The earth surface signal removal mode 141b removes earth surface signals aligned through a position detector and an X,Y stage scan objector and surrounding signals thereof together within a specific range.

In this case, there is a danger of an earth surface signal and a mine signal near an earth surface disappearing together. However, if a signal of a super high-frequency RF beam returning by being reflected or scattered from the metals, nonmetals, and initial explosive of a mine remains intact, it has a correlation with space time, and thus a signal that resonates in a ring form remains. Such a signal is set as a signal for a mine and an explosive.

The adaptive filtering mode 141c models the signal of a soil spatially, compares the modeled signal with a reception signal of a super high-frequency RF beam returning by being reflected or scattered from the metals, nonmetal, and initial explosive of a mine, and extracts a point having a good possibility of the presence of a mine and an explosive based on a difference of the comparison.

The adaptive filtering mode 141c is configured to include a filtering unit.

That is, a soil signal is modeled spatially only with respect to three-dimensional spatiotemporal data because a phenomenon in which the size of the soil signal is attenuated depending on the depth is generated.

A process of modeling a soil signal spatially is as follows.

That is, an input signal x, that is, the data of a soil including a mine including metals, nonmetals, and an initial explosive, and a required signal d are inputted.

After adaptive filtering is performed on the input signal x, an error e is computed by calculating the difference between the required signal d and a value output y as a result of calculation.

Furthermore, the coefficient of the adaptive filter is updated through an adaptive algorithm so that such an error has a minimum value.

For example, if the size of the adaptive filter is 5*8, the center pixel becomes the desired signal, and the remaining signals other than 1*9 pixels front and back in the direction in which a combatant travels based on the center pixel become the input signals x. The excluded region is called a blocking film. It is set to block previously such an effect that the signals may spatially have a correlation.

The pre-processing unit 141 for metal and nonmetal and an initial explosive of the mine including the data alignment task mode 141a, the earth surface signal removal mode 141b, and the adaptive filtering mode 141c is configured in the RF radiation beam reception antenna unit 140 as described above, so the RF radiation beam reception antenna unit 140 may primarily select signals having a good possibility that the signals may indicate mines including the metals, nonmetals, initial explosives of a mine and explosives as detection data of metal, nonmetal and initial explosives by pre-processing super high-frequency RF radiation beams reflected from metal things, a can, the root of a tree, a stone, and a lump of solid earth, which are, objects similar to a mine, and initial explosive shapes.

Fifth, the GPR control unit 150 according to the present invention is described.

The GPR control unit 150 is driven in response to a mine detection command signal transmitted by the first Bluetooth communication module, and it functions to control an overall operation of each element and to perform control so that metal, nonmetal, and initial explosive detection data is formed by analyzing the delay time and intensity of a signal received from the RF radiation beam reception antenna unit and then corrected through a nonlinear regression model and transmitted to the main microprocessor unit.

The GPR control unit 150 detects a mine through a process of detecting a signal of electromagnetic waves radiated from the RF radiation beam transmission antenna unit and returning by being reflected or scattered from a boundary surface in which the genetic characteristics of a medium is changed through the RF radiation beam reception antenna unit, and processing and analyzing the detected signal.

Accordingly, unlike a metal detector, there is an advantage in that the metals, nonmetals, and initial explosive of a mine can be detected. However, there is a disadvantage in that a misdetection ratio is high in which a signal is determined to be a mine although it is not a mine because any signal returning by being reflected from a boundary surface having different genetic characteristics is detected.

Figure 6:
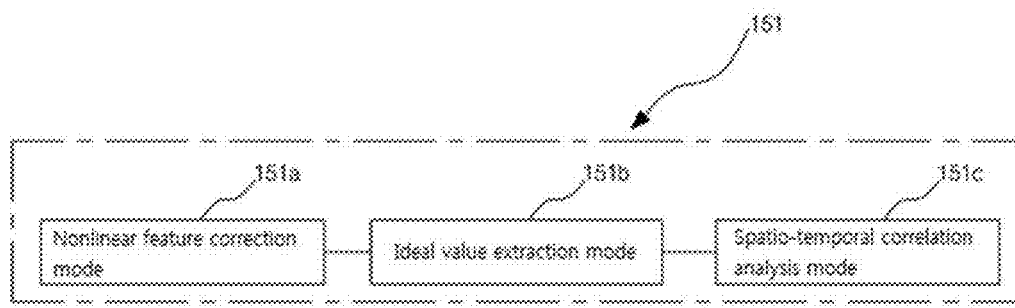
FIG. 6 is a block diagram showing the elements of the nonlinear regression model algorithm engine unit of the elements of a ground penetrating radar (GPR) control unit according to the present invention.

In order to supplement such a disadvantage, the GPR control unit 150 according to the present invention is configured to include a nonlinear regression model algorithm engine unit 151, as shown in FIG. 6.

The nonlinear regression model algorithm engine unit 151 functions to detect a signal having a good possibility that a mine and an explosive may be present from a soil signal and noise by taking into consideration a phenomenon in which the intensity of a signal detected in a received super high-frequency RF radiation beam is exponentially attenuated depending on the depth that the signal is transmitted and received.

As shown in FIG. 6, the nonlinear regression model algorithm engine unit 151 includes a nonlinear feature correction mode 151a, an ideal value extraction mode 151b, and a spatio-temporal correlation analysis mode 151c.

The nonlinear feature correction mode 151a functions to estimate a log-transformed regression model by taking into consideration a phenomenon in which the intensity of a signal detected in a received super high-frequency RF radiation beam is exponentially attenuated depending on the depth that the signal is transmitted and received, assuming that soils have uniform characteristics, and to correct nonlinear characteristics included in the unique characteristics of metal, nonmetal, and initial explosive detection data based on the extracted log-transformed regression model.

In this case, the log-transformed regression model is estimated through the following process.

That is, if the metal, nonmetal, and initial explosive detection data is represented in the form of a scatter plot using a delay time and the intensity of a received super high-frequency RF beam signal as an independent variable and an dependent variable, respectively, the dependent variable and the independent variable have a nonlinear relation.

The correlation between the two variables is linearly changed by incorporating log transform into the independent variable.

First, the correlation between the dependent variable and the log-independent variable is estimated using the log-transformed regression model, such as Equation 1 below.

$$y = \beta_0 + \beta_1 \ln(t)$$ [Equation 1]

In Equation 1, t and y denote a delay time and the intensity of a received super high-frequency RF beam signal, respectively, $\beta_0$ denotes the intensity value of a received signal in an earth surface, and $\beta_1$ denotes an attenuation constant that varies depending on the degree of loss of a medium.

Figure 27:
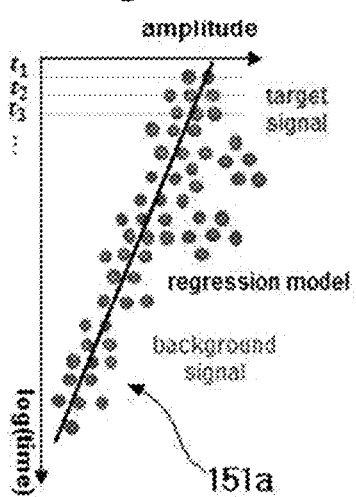
FIG. 27 is a graph showing the results of nonlinear feature correction mode according to the present invention.

That is, FIG. 27 is a graph showing the results of a nonlinear feature correction mode according to the present invention.

In this case, soil (background) signals are chiefly crowded near a regression straight line, and mine detection signals (target signals) are distributed far from the regression straight line.

The reason for this is that the soil signal and the mine detection signal have different sizes and the dominant signal among the signals which form the metal, nonmetal, and initial explosive detection data is a soil signal.

In Equation 1, $\beta_0$ and $\beta_1$ are estimated using inputted metal, nonmetal, and initial explosive detection data because they have varying values depending on a medium.

The intensity $y_i^g$ of a signal estimated through the log-transformed regression model is the same as Equation 2 below.

$$y_i^g = \beta_0 + \beta_1 \ln(t_i) + \varepsilon_i$$

In Equation 2, $t_i$ and $\varepsilon_1$ denote an i-th delay time sample in metal, nonmetal, and initial explosive detection data and an antenna measuring noise signal in the i-th delay time.

Antenna measuring noise complies with a normal distribution having an average of 0 and a standard deviation of $\sigma$, and thus the intensity of an estimated signal complies with a normal distribution, such as Equation 3 below.

$$y_i^g | N(\beta_0 + \beta_1 \ln(t_i), \sigma^2)$$

In order to extract similar mine signals, the ideal value extraction mode 151b functions to detect a mine detection signal by setting an ideal value with respect to signals far from the regression curve of the log-transformed regression model and performing a repeated process on corresponding pixels.

The ideal value extraction mode 151b is configured to include a student estimation error algorithm engine unit (Studentized residual).

The student estimation error algorithm engine unit (Studentized residual) functions to compute the distance far from the regression curve of the log-transformed regression model with respect to metal, nonmetal, and initial explosive detection data.

This is represented as in Equation 4 below.

$$T = \frac{y_{ij} - \hat{y}_i}{\hat{\sigma}\sqrt{1 + \frac{1}{n} + \frac{\left(\overline{\ln(t)} - \ln(t_i)\right)^2}{S_{TT}}}} \quad [\text{Equation 4}]$$

In Equation 4, $y_{ij}$ and $\hat{y}_i$ refer to the estimated values of the intensity of the j-th metal, nonmetal, and initial explosive detection data signal of an i-th time slice and the intensity of the metal, nonmetal, and initial explosive detection data signal of the i-th time slice, respectively. $\hat{\sigma}$ relates to a non-deviation estimated value with respect to the standard error of the metal, nonmetal, and initial explosive detection data.

$\overline{\ln(t)}^i$ is an average value of $\ln(t)$, and $t_i$ is the value of an i-th delay time sample. The student estimation error $S_{TT}$ through the student estimation error algorithm engine unit (Studentized residual) is represented as in Equation 5 below.

$$S_{TT} = \overset{n}{\underset{i=1}{Q}} \ln(t_i)^2 - \left(\overset{n}{\underset{i=1}{Q}} \ln(t_i)\right)^2 \quad [\text{Equation 5}]$$

In Equation 1, if the value of the student estimation error $S_{TT}$ is smaller than a specific value (threshold), the signal is determined to be a soil signal and removed. If not, the signal is inputted as the input signal of the log-transformed regression model and the aforementioned process is repeated. Signals that converge in the repetition process are detected as mine detection signals (=target signals).

The spatio-temporal correlation analysis mode 151c functions to detect metal, nonmetal, and initial explosive detection data using a correlation criterion based on the spatiotemporal characteristics of a mine detection signal in order to distinguish the mine detection signal from noise.

Figure 7:
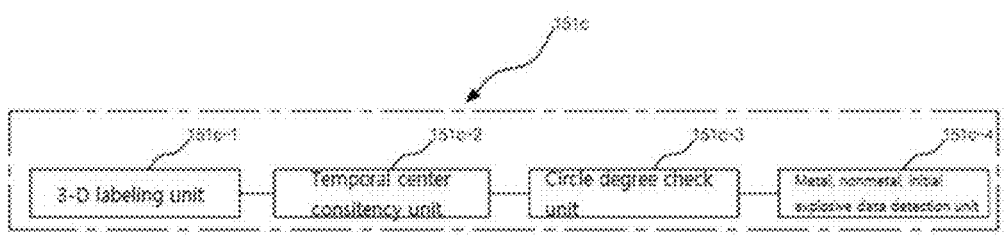
FIG. 7 is a block diagram showing the elements of spatio-temporal correlation analysis mode according to the present invention.

As shown in FIG. 7, the spatio-temporal correlation analysis mode 151c includes a 3-D labeling unit 151c-1, a temporal center consistency unit 151c-2, a roundness check unit 151c-3, and a metal, nonmetal, and initial explosive detection data detection unit 151c-4.

The 3-D labeling unit 151c-1 functions to perform 3-D labeling on a plurality of the extracted mine detection signals.

The 3-D labeling unit 151c-1 separates spatially united signals as a single object and assigns a unique number to the object.

The temporal center consistency unit 151c-2 functions to filter noise based on a difference between the center coordinates of time slices included in a single label and the spatial center coordinates of the entire label.

The temporal center consistency unit 151c-2 is configured to determine a corresponding signal to be a noise signal if a difference between the center coordinates of time slices included in an arbitrary label and the spatial center coordinates of the entire label is greater than a predetermined reference value and to remove the corresponding signal.

The roundness check unit 151c-3 functions to perform a check of roundness on labels that remain as the results of execution by the temporal center consistency unit for each label and to produce a sheet of a slice including only 0 and 255 by summing all of time slices included in a single label.

In this case, the roundness R is a criterion indicating how a shape is close to a circle. The roundness has a value of 1 with respect to an ideal circle and has a smaller value farther from the circle.

In this case, the equation for calculating the roundness R is represented as in Equation 6 below.

$$R(L) = \frac{4\pi A(L)}{l(L)^2} \quad [\text{Equation 6}]$$

In Equation 6, L is the unique number of a label, A(L) is the area of an L-th label, and l(L) is the boundary length of a circumference or shape of the L-th label.

The circle degree is reduced because the length of a boundary is increased as a shape becomes complicated in the same area.

The metal, nonmetal, and initial explosive detection data detection unit 151c-4 functions to detect metal, nonmetal, and initial explosive detection data indicative of a location having a good possibility that a mine and an explosive may be present based on results performed through the temporal center consistency unit and the circle degree check unit.

The nonlinear regression model algorithm engine unit 151 including the nonlinear feature correction mode 151a, the ideal value extraction mode 151b, and the spatio-temporal correlation analysis mode 151c is configured in the GPR control unit 150 as described above. Accordingly, a log-transformed regression model can be estimated by taking into consideration a phenomenon in which the intensity of a signal detected in a secondarily received super high-frequency RF beam is exponentially attenuated depending on the depth in which the signal is transmitted and received through the GPR control unit 150. The nonlinear attenuation characteristics without a distortion of metal, nonmetal, and initial explosive detection data can be compensated, based on the estimated log-transformed regression model. Thereafter, a location having a good possibility that a mine and an explosive may be present can be detected using the temporal-based consistency and circular property of a mine detection signal having a paraboloid characteristic.

Sixth, the first Bluetooth communication module 160 according to the present invention is described.

The first Bluetooth communication module 160 is connected to the main microprocessor unit 200 over a Bluetooth communication network, and functions to receive a mine detection command signal from the main microprocessor unit, transfer the mine detection command signal to the GPR control unit, and transmit metal, nonmetal, and initial explosive detection data to the main microprocessor unit.

Furthermore, the human body antenna unit according to the present invention is connected to an interface through SPI communication instead of the first Bluetooth communication module, and is configured to receive a mine detection command signal from the main microprocessor unit and to transmit metal, nonmetal, and initial explosive detection data detected by the human body antenna unit to the main microprocessor unit.

Next, the main microprocessor unit 200 according to the present invention is described.

The main microprocessor unit 200 functions to control an overall operation of each element.

The main microprocessor unit 200 is formed on one side within a bulletproof vest body and configured to control an overall operation of each element, to receive signals detected by the human body antenna unit, to compute the distances, locations, forms, materials, and topographies of corresponding mines in a 2-D or 3-D manner, to perform control so that the computed results are output on the smart glasses unit and the body-mounted LCD monitor along with received GPS location information data, and to control the wireless transmission of current mine location data, the image data of surrounding geographic features, the current location of a combatant, and the battery state of the belt-type power supply unit through the wireless data transmission and reception unit.

Figure 8:
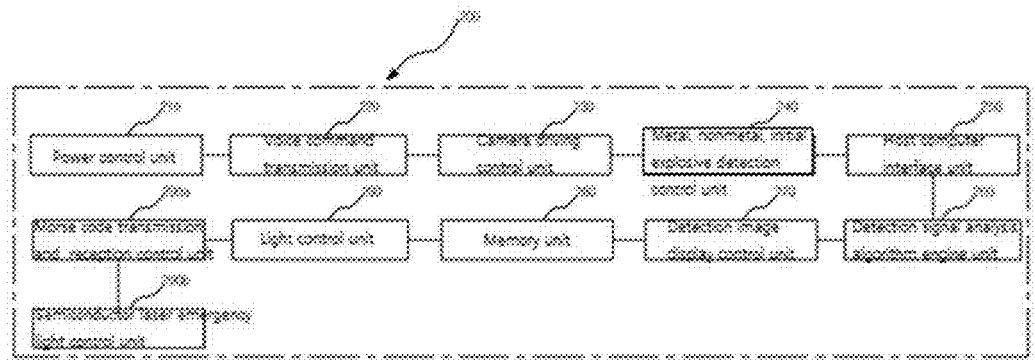
FIG. 8 is a block diagram showing the elements of a main microprocessor unit according to the present invention.

As shown in FIG. 8, the main microprocessor unit 200 includes a power control unit 210, a voice command transmission unit 220, a camera driving control unit 230, a metal, nonmetal, and initial explosive detection control unit 240, a host computer interface unit 250, a detection signal analysis algorithm engine unit 260, a detection image display control unit 270, a memory unit 280, a light control unit 290, a Morse code transmission and reception control unit 290a, and a semiconductor laser emergency light control unit 290b.

First, the power control unit 210 according to the present invention is described.

The power control unit 210 functions to check the power state of each of the smart glasses unit, the body-mounted LCD monitor unit, the wireless data transmission and reception unit, the black box-type camera unit, and the security communication headset, to perform a wired connection with the belt-type power supply unit when power of the portable battery is insufficient, and to generate a control command signal so that power is supplied.

Second, the voice command transmission unit 220 according to the present invention is described.

The voice command transmission unit 220 functions to output a voice command signal and a special mission command signal to the security communication headset in a speaker sound form.

Third, the camera driving control unit 230 according to the present invention is described.

The camera driving control unit 230 is connected to a black box-type camera unit over a Bluetooth communication network, and functions to output a driving command signal to the black box-type camera unit, to receive image data captured by the black box-type camera unit, and to transfer the image data to the memory unit.

Fourth, the metal, nonmetal, and initial explosive detection control unit 240 according to the present invention is described.

The metal, nonmetal, and initial explosive detection control unit 240 is connected to the human body antenna unit over a Bluetooth communication network, and functions to output a mine detection command signal to the human body antenna unit, to receive metal, nonmetal, and initial explosive detection data from the human body antenna, and to transfer the metal, nonmetal, and initial explosive detection data to the detection signal analysis algorithm engine unit.

Fifth, the host computer interface unit 250 according to the present invention is described.

The host computer interface unit 250 functions to connect to a remote battle command server in a wired/wireless manner through RS-232C, USB, and/or Wi-Fi.

Sixth, the detection signal analysis algorithm engine unit 260 according to the present invention is described.

The detection signal analysis algorithm engine unit 260 functions to analyze metal, nonmetal, and initial explosive detection data received from the metal, nonmetal, and initial explosive detection control unit by comparing the received metal, nonmetal, and initial explosive detection data with predetermined reference detection modeling and then to compute the distances, locations, forms, materials, and topographies of corresponding mines in a 2-D or 3-D manner.

In this case, the detection data of a cylindrical drum shape, plastic material, and initial explosive of an M-14 anti-personal mine, the detection data of a cylindrical drum shape, metal material, and initial explosive of an M-16A1 anti-personal mine, the detection data of a cylindrical drum shape, metal and nonmetal materials, and initial explosive of an M-15 anti-tank mine, the detection data of a rectangle box shape, metal and nonmetal materials, and initial explosive of an M-19 anti-tank mine, the detection data of a cylindrical drum shape, metal material, and initial explosive of a K-442 anti-tank mine, the detection data of a thin pole-formed, steel and plastic materials, and initial explosive of a KM1 pull action igniter installed on the side of an M-15,19 anti-tank mine, a KM1A1 pressure type installed at the bottom of the M-15,19 anti-tank mine, and the plastic material igniter thereof, the detection data of the steel and plastic materials of an improved explosive device (IED) and an initial explosive, such as a bowling ball, the detection data of an initial explosive regarding stacked mines of a steel semi-infantry mine (2.2t), the detection data of the initial explosive of a PMD semi-infantry mine (6/57) having a tree lunch box form, the detection data of the initial explosive of a PMD semi-infantry mine (44/64) having a tree rectangle box form, and the detection data of a cylindrical drum shape, metal material, and initial explosive of an iron hemiprosthesis mine (41/46) have been databased. The reference detection modeling is configured to analyze current detected metal, nonmetal, and initial explosive detection data received from the initial explosive detection control unit by comparing the detection data with a comparison reference value.

Seventh, the detection image display control unit 270 according to the present invention is described.

The detection image display control unit 270 functions to perform control so that current mine location data, the image data of surrounding geographic features, and an emergency message signal are displayed on the smart glasses unit and the body-mounted LCD monitor.

Eighth, the memory unit 280 according to the present invention is described.

The memory unit 280 functions to store image data, metal, nonmetal, and initial explosive detection data, and GPS location data.

Ninth, the light control unit 290 according to the present invention is described.

The light control unit 290 functions to control the light brightness and on-off driving of each element.

Tenth, the Morse code transmission and reception control unit 290a according to the present invention is described.

The Morse code transmission and reception control unit 290a functions to select the on/off emission cycle of a semiconductor laser diode in an emergency Morse code manner and to synchronize the smart wearable mine detector with another smart wearable mine detector so that a wireless call is performed.

The Morse code transmission and reception control unit 290a transmits read data, including GPS information, to a strategy command server in a remote place using a middle-distance and short-distance optical communication function through the semiconductor laser diode.

That is, the Morse code transmission and reception control unit 290a is configured to perform communication using a semiconductor laser diode in preparation for a case where a wireless communication network has failed due to an electromagnetic pulse (EMP) attack in battle.

Eleventh, the semiconductor laser emergency light control unit 290b according to the present invention is described.

The semiconductor laser emergency light control unit 290b functions to notify another adjacent smart wearable mine detector of an emergency situation using an emergency light through a semiconductor laser when the emergency situation is generated.

As described above, the smart wearable mine detector according to the present invention can identify the metals and nonmetals of a mine and the initial explosives of a mine and an explosive by primarily pre-processing super high-frequency RF radiation beams reflected from metal things, a can, the root of a tree, a stone, and a lump of solid earth, which are, objects similar to a mine, and an initial explosive form through the RF radiation beam reception antenna unit 140, secondarily correcting the signal through a phenomenon in which the intensity of the signal detected in GPR is exponentially attenuated depending on the depth in which the signal is transmitted and received through the GPR control unit 150, and thirdly analyzing metal, nonmetal, and initial explosive detection data received from the metal, nonmetal, and initial explosive detection control unit 240 by comparing the received metal, nonmetal, and initial explosive detection data with predetermined reference detection modeling through the detection signal analysis algorithm engine unit 260. Accordingly, the ability to identify a mine and an explosive can be improved by 90% compared to an existing mine detector.

After whether a signal indicates a mine is determined through the detection signal analysis algorithm engine unit 260, the main microprocessor unit 200 is configured to select any one of text transmission, a text to speech (TTS) signal, and image transmission and to transmit the information to another smart wearable mine detector of another combatant who engages in battle over a Wi-Fi communication network or, a Bluetooth communication network.

Next, the smart glasses unit 300 according to the present invention is described.

Figure 9:
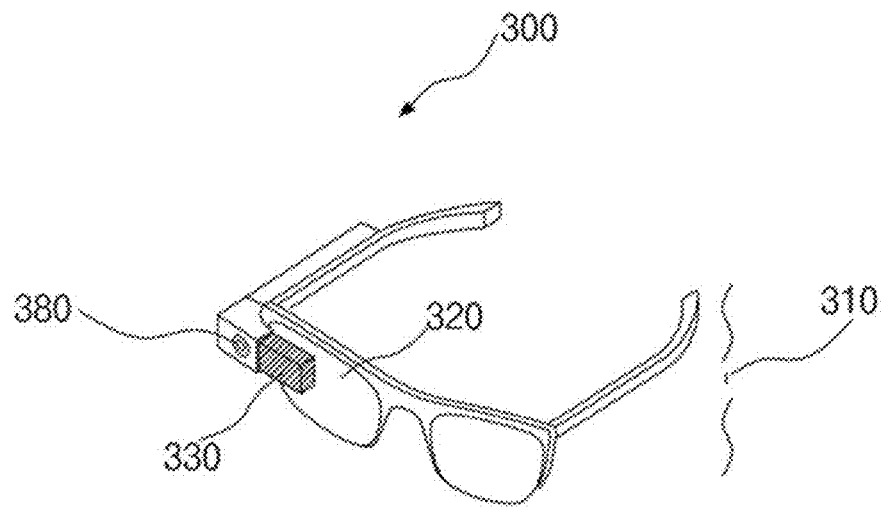
FIG. 9 is a perspective view of the external elements of a smart glasses unit according to the present invention.

As shown in FIG. 9, the smart glasses unit 300 is worn on an eye of a combatant, and functions to display 2D/3D display data of the distance, location, form, and material of the mine, and GPS location information received from the main microprocessor unit 200 and a special mission command signal received from a battle command server on a surface of smart glasses and to switch to infrared glasses mode at night so that a surrounding object is identified.

Figure 10:
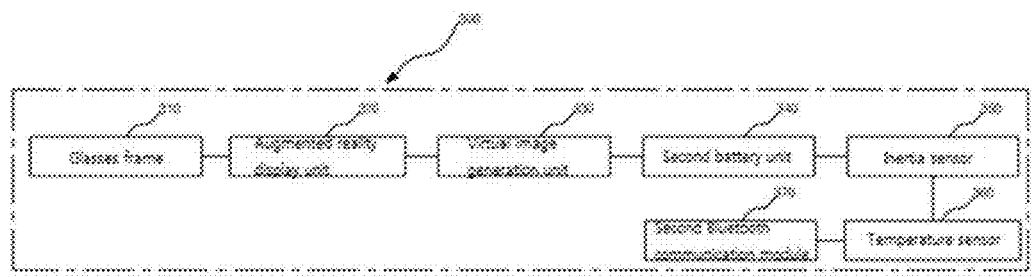
FIG. 10 is a block diagram showing the elements of the smart glasses unit according to the present invention.

As shown in FIG. 10, the smart glasses unit 300 includes a glasses frame 310, an augmented reality display unit 320, a virtual image generation unit 330, a second battery unit 340, an inertia sensor 350, a temperature sensor 360, and a second Bluetooth communication module 370.

The glasses frame 310 includes two lenses, an eyebrow support frame, a nose bridge, and an ear rest so that it is attached to the nose and ears of the body.

The augmented reality display unit 320 includes a light guide optical part, an opaque filter, and a fluoroscopy lens, and functions to receive a virtual image generated by the virtual image generation unit, to display the distance, location, form, and material of a mine and a special mission command signal on a fluoroscopy in a text form, and to display 2D/3D display data and GPS location information data in an augmented reality form.

The augmented reality display unit 320 includes a multi-micro display in order to improve resolution and a field of vision using an OLED display in addition to glasses, the opaque filter, and the fluoroscopy lens.

The virtual image generation unit 330 functions to project a virtual image onto a light guide optical part through a collimation lens.

Upon night combat, the virtual image generation unit 330 switches to an infrared glasses mode by projecting a color conversion image onto a light guide optical part through a collimation lens in addition to a virtual image.

The second battery unit 340 is located on one side of the front end of the ear rest of the glasses frame and functions to supply power to each element.

Figure 11:
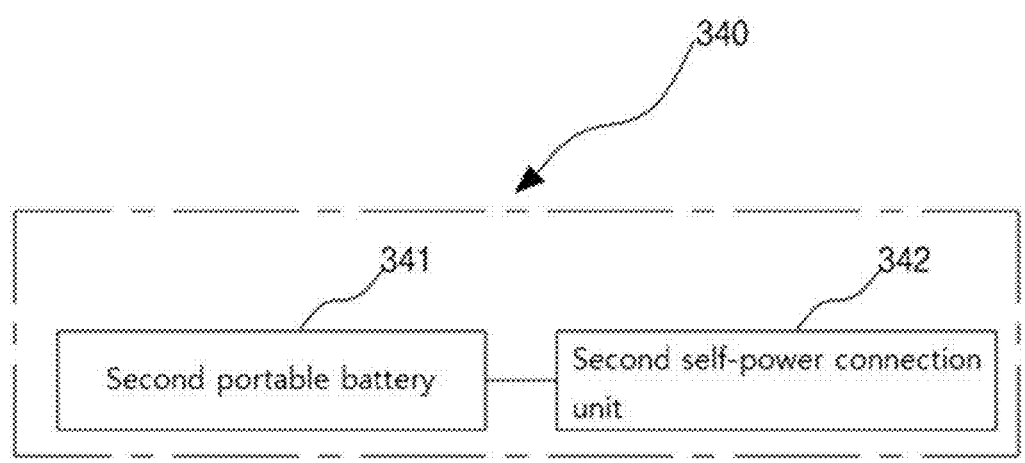
FIG. 11 is a block diagram showing the elements of a second battery unit according to the present invention.

As shown in FIG. 11, the second battery unit 340 includes a second portable battery 341 and a second self-power connection unit 342.

The second portable battery 341 has a lithium ion battery formed therein in a pack structure, and functions to supply main power to each element.

The second self-power connection unit 342 functions to be supplied with emergency self-power in a wired manner through the belt-type power supply unit 600 when the second portable battery is discharged.

The inertia sensor 350 functions to detect a location, a direction, and acceleration of the glasses frame.

The temperature sensor 360 functions to sense a temperature around the glasses frame.

The second Bluetooth communication module 370 is connected to the main microprocessor unit 200 over a Bluetooth communication network, and functions to receive the data of distance, location, form, and material of the mine, special mission command signal data, 2D/3D display data, and GPS location information data from the main microprocessor unit, to transfer them to the augmented reality display unit 320, and to transmit an inertia sensor value and a temperature sensor value.

The smart glasses unit 300 according to the present invention is configured to include an auxiliary camera unit 380 on one side of the upper side of the augmented reality display unit 320, for recognizing the voice of a combatant and capturing an image based on a line of sight seen by a combatant.

Figure 12:
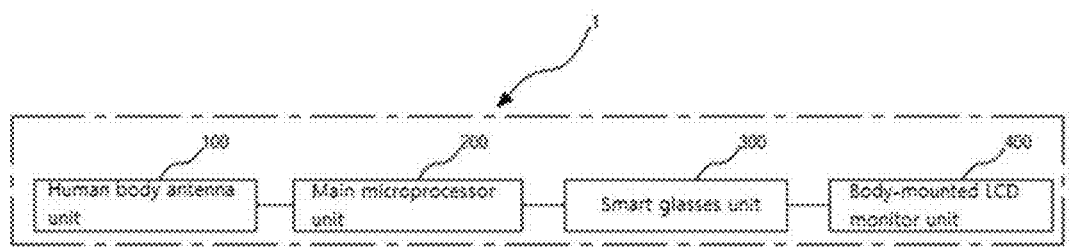
FIG. 12 is a block diagram showing the elements of a smart wearable mine detector including a body-mounted LCD monitor unit 400 in addition to the human body antenna unit 100, the main microprocessor unit 200, and the smart glasses unit 300 according to the present invention.

Furthermore, as shown in FIG. 12, a smart wearable mine detector 1 according to the present invention is configured to include a body-mounted LCD monitor unit 400 in addition to the human body antenna unit 100, the main microprocessor unit 200, and the smart glasses unit 300.

The body-mounted LCD monitor unit 400 is detachably installed on the body, and functions to display 2D/3D display data of the distance, location, form, and material of the mine, and GPS location information data received from the main microprocessor unit on an LCD screen, to transfer a request signal of a combatant received through a keypad to the main microprocessor unit, and to output an alarm sound according to the distance close to a mine.

Figure 13:
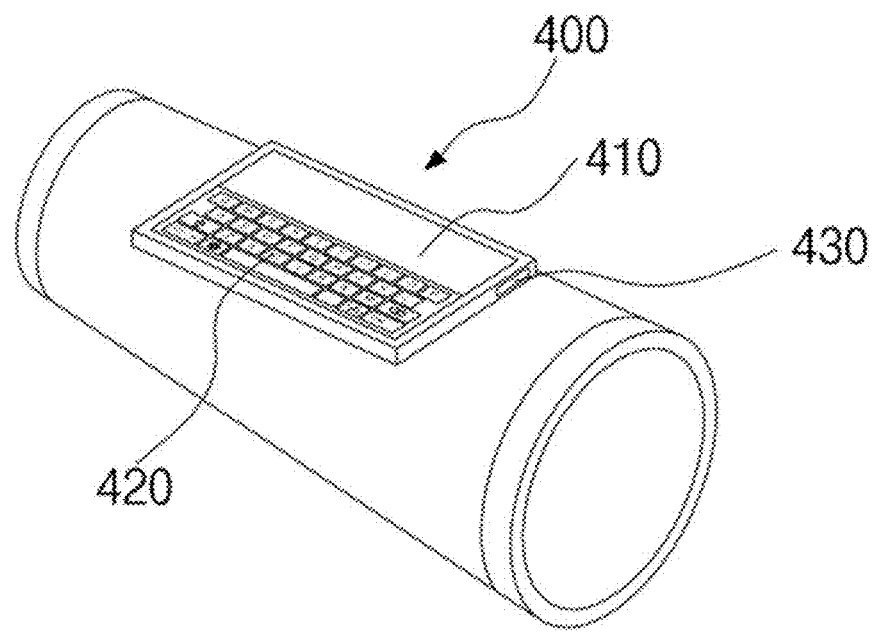
FIG. 13 is a perspective view of the external elements of the body-mounted LCD monitor unit according to the present invention.

As shown in FIG. 13, the body-mounted LCD monitor unit 400 includes a monitor main body 410, a keypad unit 420, and a second Bluetooth communication module 430.

The monitor main body 410 has a rectangle shape and functions to protect each element against external pressure and to support the element.

The monitor main body 410 includes any one of an LCD monitor and an LED monitor.

The keypad unit 420 includes numbers and the Korean alphabet and functions to input a request signal (a battle command signal, a combat support troops supply signal, or a wound signal and so on) from a combatant.

The second Bluetooth communication module 430 is connected to the main microprocessor unit 200 over a Bluetooth communication network, and functions to receive the distance, location, form, and material of the mine, 2D/3D display data, and GPS location information data from the main microprocessor unit, to transfer them to the monitor main body, and to transfer a request signal of a combatant received through the keypad unit to the main microprocessor unit.

Figure 14:
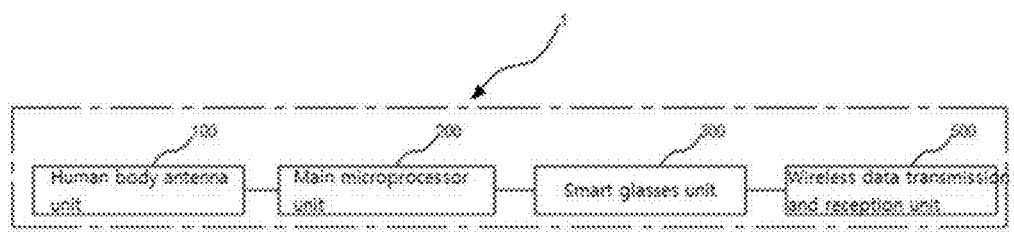
FIG. 14 is a block diagram showing the elements of a smart wearable mine detector configured to include a wireless data transmission and reception unit 500 in addition to the human body antenna unit 100, the main microprocessor unit 200, and the smart glasses unit 300 according to the present invention.

Furthermore, as shown in FIG. 14, a smart wearable mine detector 1 according to the present invention is configured to include a wireless data transmission and reception unit 500 in addition to the human body antenna unit 100, the main microprocessor unit 200, and the smart glasses unit 300.

The wireless data transmission and reception unit 500 is formed on one side of the lower side within a bulletproof vest body, and functions to connect to a remote battle command server over a Wi-Fi wireless communication network, to transmit current mine location data, the image data of surrounding geographic features, the current location of a combatant, and the battery state of the belt-type power supply unit under the control of the main microprocessor unit, to receive a voice command signal and a special mission command signal as response signals for the data, and to transfer the voice command signal and the special mission command signal to the main microprocessor unit.

The wireless data transmission and reception unit 500 includes a Wi-Fi wireless communication module.

Figure 15:
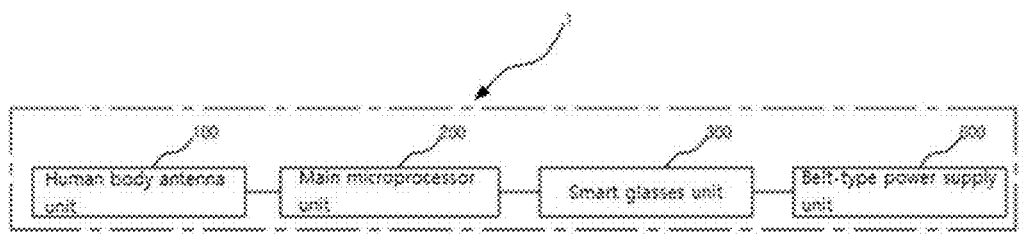
FIG. 15 is a block diagram showing the elements of a smart wearable mine detector configured to include a belt-type power supply unit 600 in addition to the human body antenna unit 100, the main microprocessor unit 200, and the smart glasses unit 300 according to the present invention.

Furthermore, as shown in FIG. 15, a smart wearable mine detector 1 according to the present invention is configured to include the belt-type power supply unit 600 in addition to the human body antenna unit 100, the main microprocessor unit 200, and the smart glasses unit 300.

The belt-type power supply unit 600 is attached to the body and functions to supply power to each element.

Figure 16:
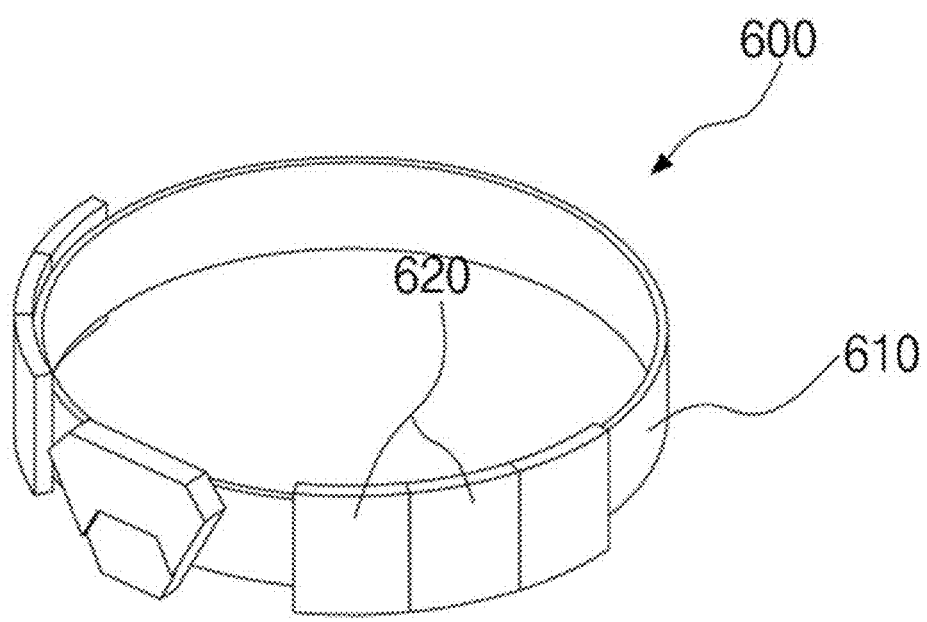
FIG. 16 is a perspective view of the external elements of the belt-type power supply unit 600 according to the present invention.

As shown in FIG. 16, the belt-type power supply unit 600 is configured to have a plurality of portable lithium ion batteries 620 mounted on a belt-type body 610.

Furthermore, the plurality of portable lithium ion batteries converts power into power suitable for the main microprocessor unit 200, the smart glasses unit 300, the body-mounted LCD monitor unit 400, the wireless data transmission and reception unit 500, the black box-type camera unit 700, and the security communication headset 800 through a DC 5V, 12V, 24V conversion adaptor, and supplies power to the smart glasses unit 300, the body-mounted LCD monitor unit 400, the wireless data transmission and reception unit 500, the black box-type camera unit 700, and the security communication headset 800 in response to a control signal from the main microprocessor unit 200.

Furthermore, the belt-type power supply unit according to the present invention is configured to include a solar cell power supply unit for accumulating solar electricity by forming a solar cell on the back portion of the body or a bombproof helmet.

Figure 17:
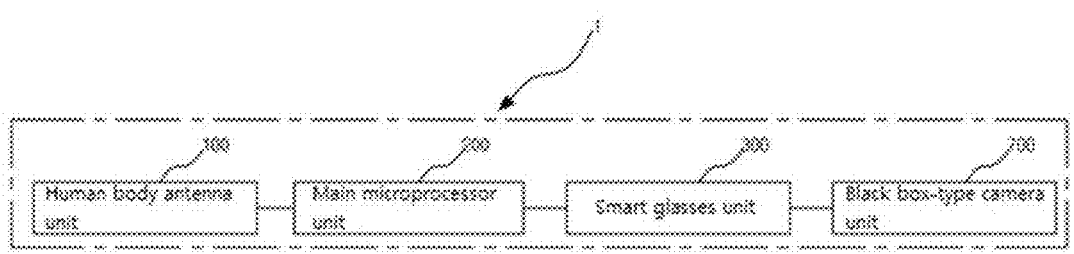
FIG. 17 is a block diagram showing the elements of a smart wearable mine detector configured to include a black box-type camera unit 700 in addition to the human body antenna unit 100, the main microprocessor unit 200, and the smart glasses unit 300 according to the present invention.

Furthermore, as shown in FIG. 17, a smart wearable mine detector 1 according to the present invention is configured to include the black box-type camera unit 700 in addition to the human body antenna unit 100, the main microprocessor unit 200, and the smart glasses unit 300.

Figure 18:
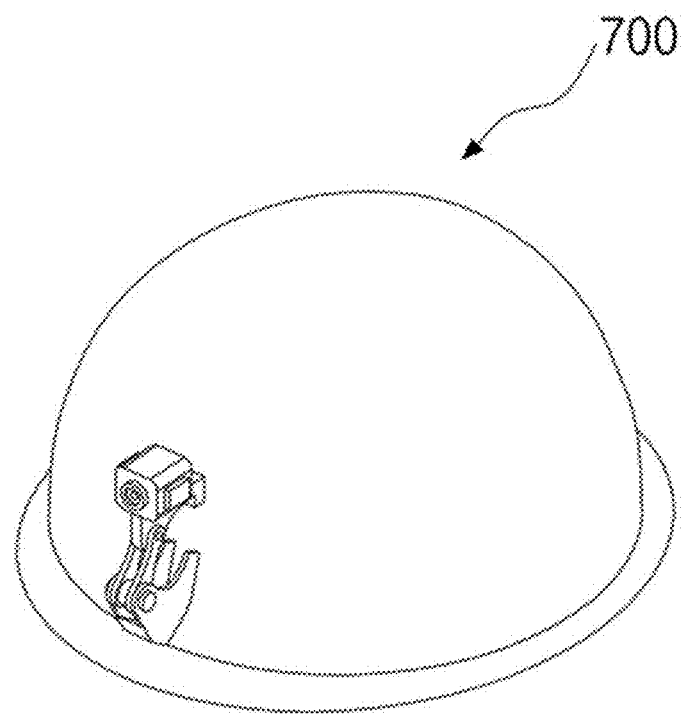
FIG. 18 is a perspective view of the external elements of the black box-type camera unit according to the present invention.

As shown in FIG. 18, the black box-type camera unit 700 is located on one side on the upper side of a bombproof helmet put on the head of the body, and functions to photograph surrounding situations of a moving combatant in real time and to store the captured image data.

Figure 19:
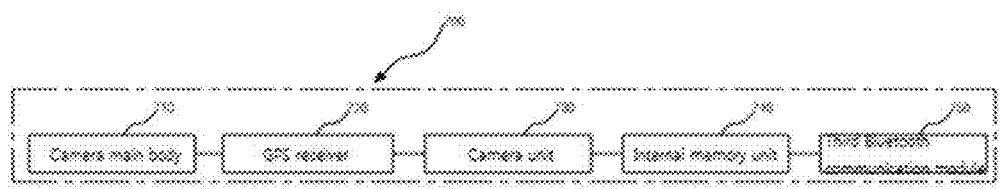
FIG. 19 is a block diagram showing the elements of the black box-type camera unit according to the present invention.

As shown in FIG. 19, the black box-type camera unit 700 includes a camera main body 710, a GPS receiver 720, a camera unit 730, an internal memory unit 740, and a third Bluetooth communication module 750.

The camera main body 710 has a cylindrical shape as an external structure and functions to support and protect each element.

The GPS receiver 720 is formed on one side on the side of the camera main body 710 and functions to receive GPS information from GPS satellites and also receive the current location of a combatant.

The GPS receiver 720 is located on the head of the body and configured to accurately receive GPS information in a forest or mountainous area.

The camera unit 730 is formed on the head portion of the camera main body and functions to capture images of surrounding situations in which a combatant moves in real time.

The internal memory unit 740 is formed in the internal space of the camera main body in an airtight box shape, and functions to store the current location data of a combatant received from the GPS receiver and captured image data from the camera unit.

The third Bluetooth communication module 750 is located on one side of the internal memory unit and connected to the main microprocessor unit 200 over a Bluetooth communication network, and functions to transmit the current location data and image data of a combatant stored in the internal memory unit.

Figure 20:
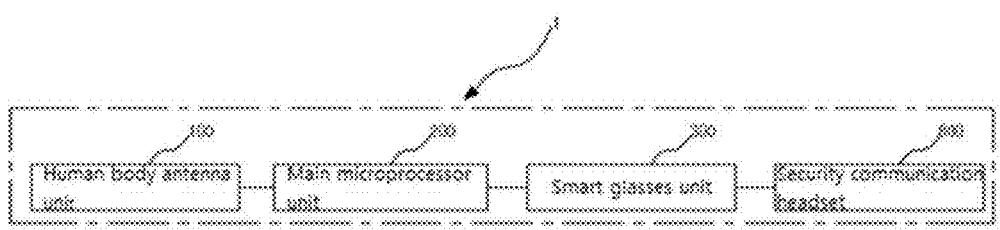
FIG. 20 is a block diagram showing the elements of a smart wearable mine detector configured to include a security communication headset 800 in addition to the human body antenna unit 100, the main microprocessor unit 200, and the smart glasses unit 300 according to the present invention.

Furthermore, as shown in FIG. 20, a smart wearable mine detector 1 according to the present invention is configured to include a security communication headset 800 in addition to the human body antenna unit 100, the main microprocessor unit 200, and the smart glasses unit 300.

Figure 21:
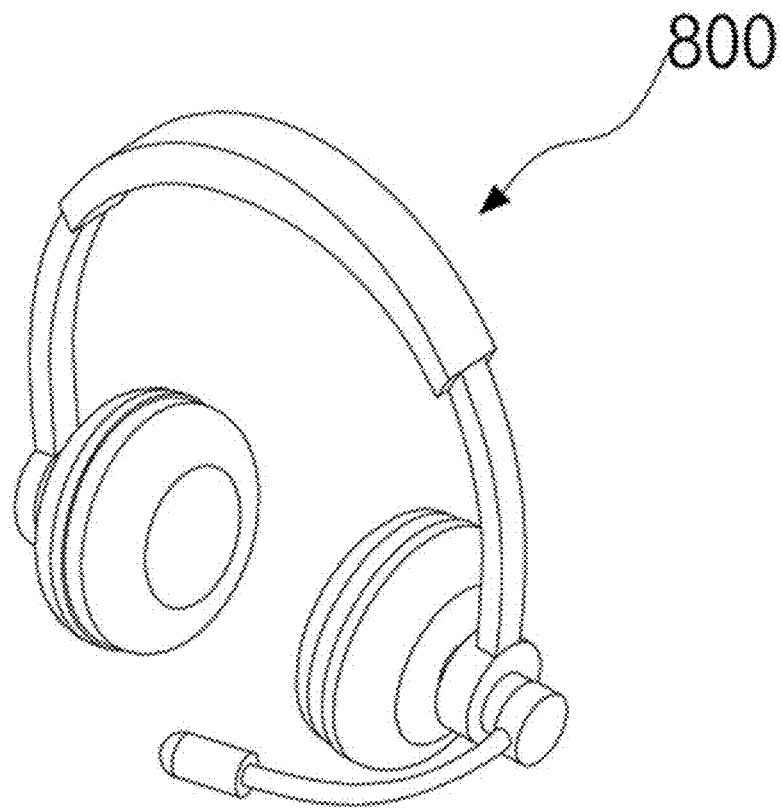
FIG. 21 is a perspective view of the external elements of the security communication headset according to the present invention.

As shown in FIG. 21, the security communication headset 800 is worn on the ear and mouth of a combatant, and functions to perform synchronization with another adjacent smart wearable mine detector in an emergency Morse code manner so that a wireless call is performed and to output a voice command signal and a special mission command signal transmitted to the main microprocessor unit in a speaker sound form.

The security communication headset 800 has earphones and a microphone integrated therein.

The security communication headset is configured to transmit and receive analyzed voice signal information and the voice signal of a detection soldier.

Figure 23:
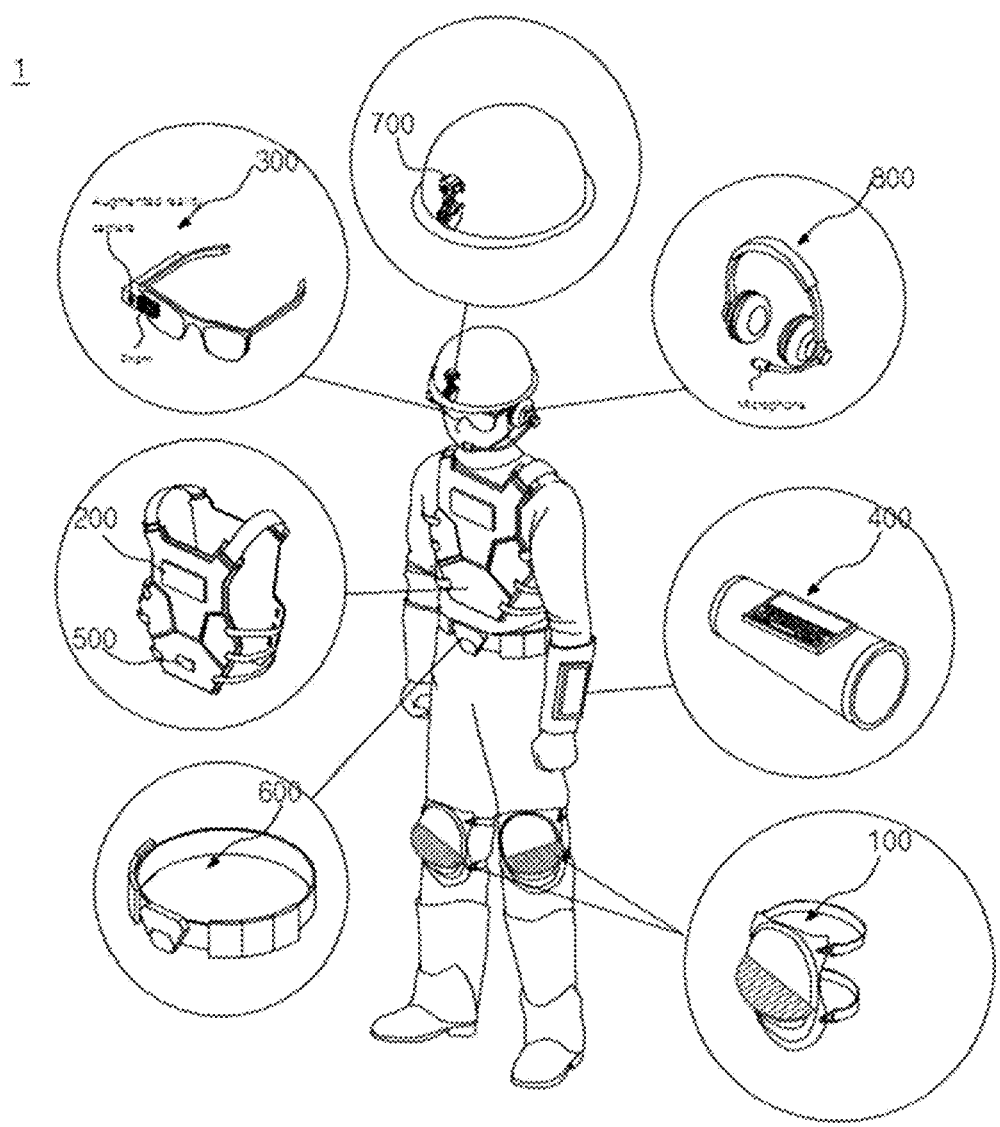
FIG. 23 shows an embodiment showing that the smart wearable mine detector has been configured in the head, torso, arm, waist, leg, etc. of a body in the state in which a combat uniform has been worn according to the present invention.

As described above, as shown in FIG. 23, a smart wearable mine detector according to the present invention includes one or two or more of the body-mounted LCD monitor unit 400, the wireless data transmission and reception unit 500, the belt-type power supply unit 600, the black box-type camera unit 700, and the security communication headset 800 in addition to the human body antenna unit 100, the main microprocessor unit 200, and the smart glasses unit 300. Accordingly, the smart wearable mine detector is detachably attached to the body in the state in which a combat uniform has been worn, and can detect the metals, nonmetals, and initial explosives of mines at the front and on the sides in all directions of 360° through super high-frequency RF beams and a neutron technique and can transmit the detected data in real time to notify a combatant of the detected data so that the combatant can engage in battle avoiding the mines.

A smart wearable mine detection method according to the present invention is described below.

Figure 24:
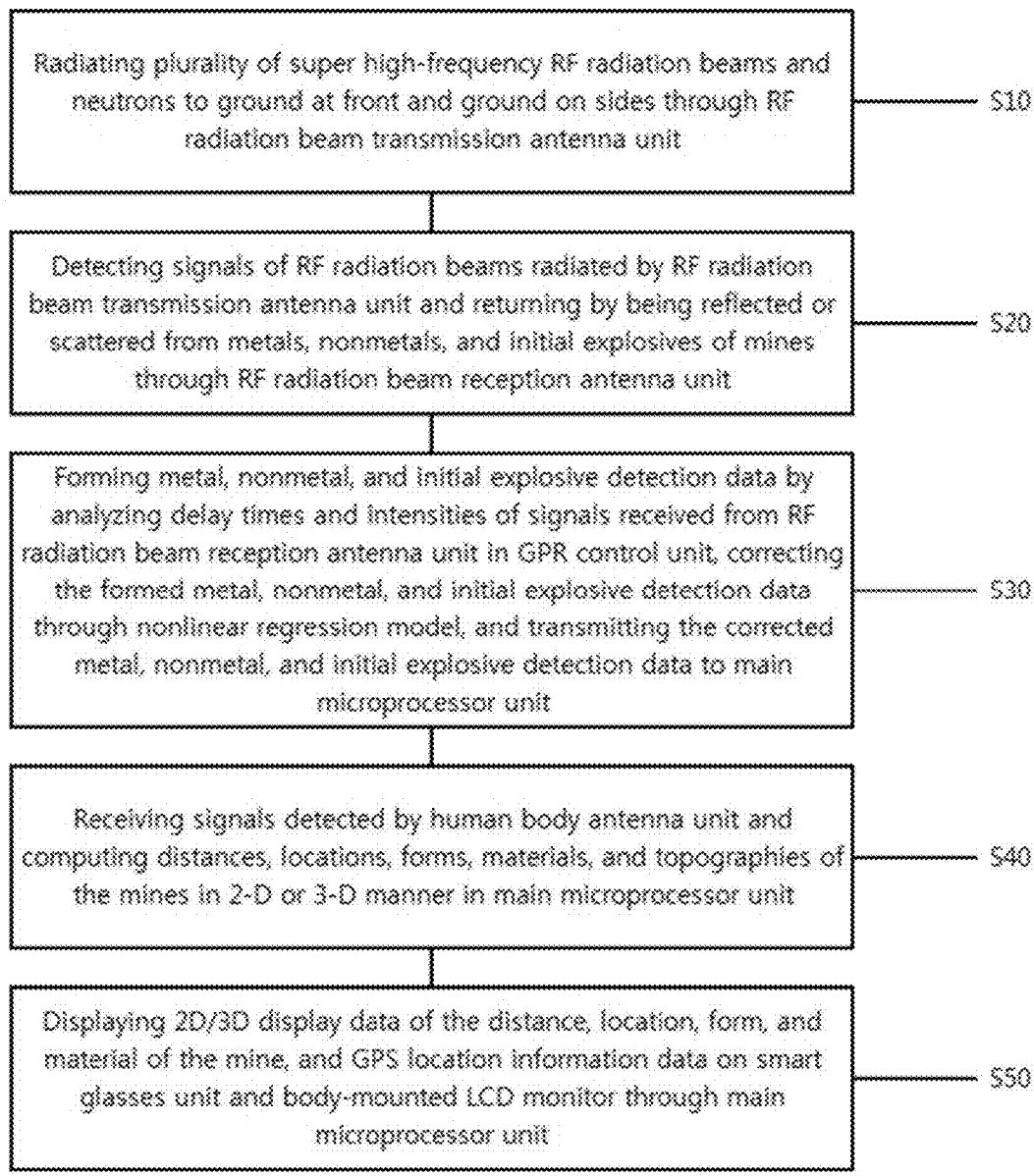
FIG. 24 is a flowchart showing a smart wearable mine detection method according to the present invention.

First, as shown in FIG. 24, a plurality of super high-frequency RF radiation beams and neutrons are radiated to the ground at the front and the ground on the sides in a flexible loop radiation type antenna structure through the RF radiation beam transmission antenna unit (S10).

Next, the RF radiation beam reception antenna unit detects the signals of the RF radiation beams radiated by the RF radiation beam transmission antenna and returning by being reflected or scattered from the metals, nonmetals, and initial explosives of mines (S20).

Next, the GPR control unit forms metal, nonmetal, and initial explosive detection data by analyzing the delay times and intensities of the signals received from the RF radiation beam reception antenna unit, corrects the formed metal, nonmetal, and initial explosive detection data through a nonlinear regression model, and transmits the corrected metal, nonmetal, and initial explosive detection data to the main microprocessor unit (S30).

Next, the main microprocessor unit receives signals detected by the human body antenna unit and computes the distances, locations, forms, materials, and topographies of corresponding mines in a 2-D or 3-D manner (S40).

Finally, the main microprocessor unit outputs the distance, location, form, and material of the mine, 2D/3D display data, and GPS location information data to the smart glasses unit and the body-mounted LCD monitor (S50).

Figure 26:
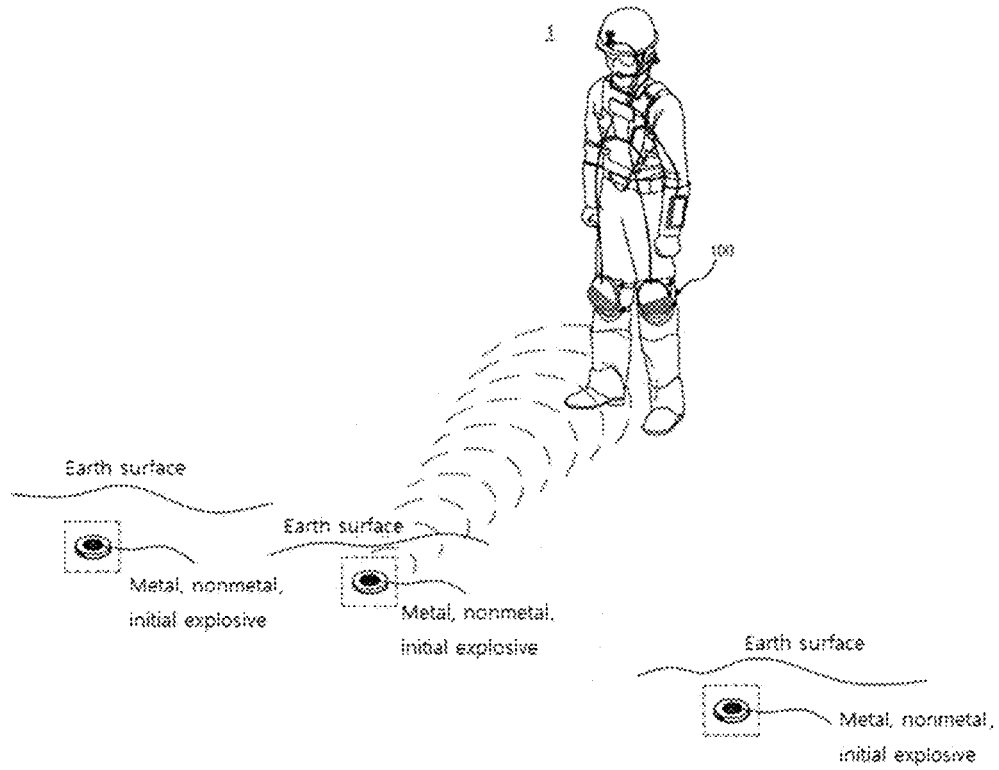
FIG. 26 shows an embodiment showing that smart wearable mine detector according to the present invention is detachably attached to the body and detects the metals and nonmetals of mines on the front and side using super high-frequency RF beams, detects the initial explosives of the mines using a neutron technique in all directions of 360°, and notifies a combatant of the detection so that the combatant engage in battle avoiding the mines.

That is, as shown in FIG. 26, the smart wearable mine detector according to the present invention is detachably attached to on the head, torso, arm, waist, leg, etc. of the body, and detects the metals, nonmetals, and initial explosives of mines at the front and on the sides in all directions of 360° through super high-frequency RF beams and a neutron technique and notifies a combatant of the detected data so that the combatant engages in battle avoiding the mines.

A detailed operational process of the human body antenna unit driven under the control of the main microprocessor unit according to the present invention is described below.

Figure 25:
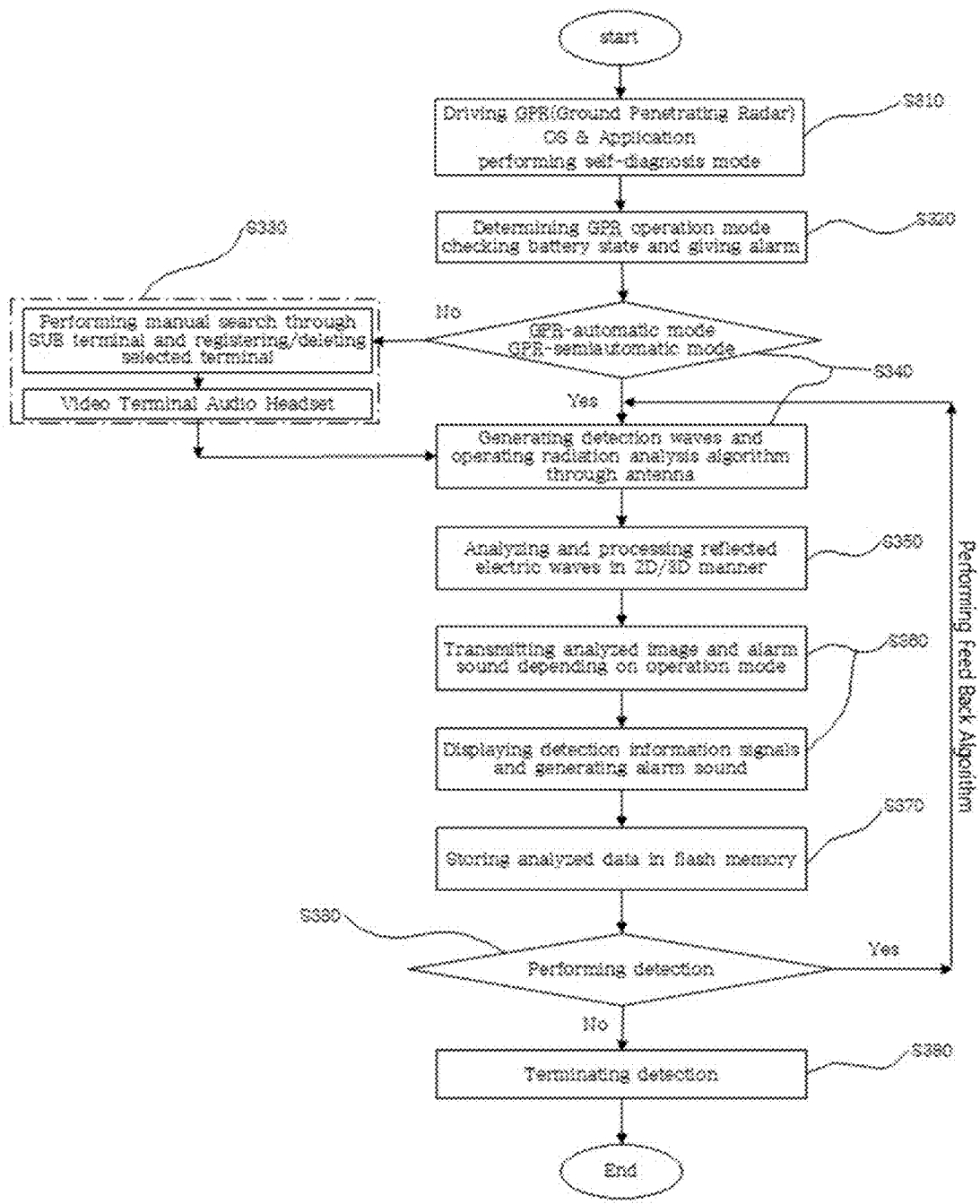
FIG. 25 is a flowchart showing a detailed operational process S300 of the human body antenna unit driven under the control of the main microprocessor unit according to the present invention.

First, as shown in FIG. 25, the human body antenna unit is driven under the control of the main microprocessor unit (S310). In this case, whether the human body antenna unit is normal or abnormal is checked by performing a self-diagnosis mode.

Next, a GPR operation mode (a GPR-automatic mode or a GPR-semiautomatic mode) of the human body antenna unit is determined under the control of the main microprocessor unit, the battery state of the human body antenna unit is checked, and power is supplied to the human body antenna unit according to an emergency self-power mode through the belt-type power supply unit along with an alarm signal if battery power is insufficient (S320).

Next, if a GPR operation mode of the human body antenna unit is not selected, manual search is performed through a sub-terminal, a selected terminal is registered or deleted, and a video terminal and an audio headset are configured and registered (S330).

Next, if a GPR operation mode of the human body antenna unit is selected, the human body antenna unit is driven to generate detection radio waves through the RF radiation beam transmission antenna unit (S340).

Next, the detection signal analysis algorithm engine unit 260 of the main microprocessor unit 200 analyzes metal, nonmetal, and initial explosive detection data received from the human body antenna unit 100 by comparing the received metal, nonmetal, and initial explosive detection data with predetermined reference detection modeling, and then computes the distances, locations, forms, materials, and topographies of corresponding mines in a 2-D or 3-D manner (S350).

Next, the detection image display control unit 270 of the main microprocessor unit performs control so that current mine location data, the image data of surrounding geographic features, and an emergency message signal are displayed on the smart glasses unit and the body-mounted LCD monitor unit (S360).

Next, the current mine location data, the image data of the surrounding geographic features, and the emergency message signal are stored in the memory unit (S370).

Next, whether a mine will be detected or not is checked through the human body antenna unit under the control of the main microprocessor unit (S380).

Finally, when a signal indicative of the end of mine detection is received, the mine detection is terminated (S390).

INDUSTRIAL APPLICABILITY

Combat efficiency can be improved because mines on the ground and buried underground can be effectively detected and a combatant can engage in battle avoiding a mine.

The invention claimed is:
1. A smart wearable mine detector, comprising:
a human body antenna unit detachably installed on a body of a combatant, for detecting a mine through a super high-frequency RF beam and a neutron technique,
a main microprocessor unit for controlling an overall operation of each element, and
a smart glasses unit worn on an eye of the combatant, for displaying 2D/3D display data of a distance, location, form, and material of the mine, and GPS location information data received from the main microprocessor unit and a special mission command signal transmitted from a battle command server on the surface of the glasses,
wherein the human body antenna unit comprises:
an antenna body protruded in a circular fan shape to protect and support one or more elements of the human body antenna;
a first battery unit located on one side within the antenna body to supply power to the one or more elements of the human body antenna;
a RF radiation beam transmission antenna unit located on a head of the antenna body to apply an electromagnetic flow method of an oscillation frequency bandwidth 300 MHz~500 MHz, set audible frequency for generation of a mine detection message to 1000 Hz~2000 Hz, and radiate super high-frequency RF radiation beams and neutrons to the ground at the front and the ground on the sides in a flexible loop radiation type antenna structure;

a RF radiation beam reception antenna unit located on a head of the antenna body to detect the signals of the super high-frequency RF radiation beams and the neutrons returning by being reflected or scattered from the mines;

a ground penetrating radar (GPR) control unit driven in response to a mine detection command signal transmitted by a first Bluetooth communication module to control an overall operation of one or more elements of the human body antenna unit so that detection data of the mine is formed by analyzing the delay time and intensity of a signal received from the RF radiation beam reception antenna unit and then corrected through a nonlinear regression model and transmitted to the main microprocessor unit, wherein the RF radiation beam reception antenna unit comprises a pre-processing unit to pre-process the super high-frequency RF radiation beams reflected from metal objects, a can, the root of a tree, a stone, and a lump of solid earth which are objects similar to a mine, and to remove an error factor in order to select signals of the mine including explosive, and wherein the pre-processing unit further comprises:
  a data alignment task mode to form earth surface signals as sharp earth surface signals by correcting a phenomenon in which the earth surface signals look overlapped in several folds when the human body antenna unit is shaken by an impact during walking;
  an earth surface signal removal mode to remove aligned earth surface signals; and
  an adaptive filtering mode to model the signals of a soil spatially, compare the modeled signals with reception signals of the super high-frequency RF radiation beams returning by being reflected or scattered from the mine, and extract a point having possibility of the presence of the mine.

2. The smart wearable mine detector of claim 1, wherein the human body antenna unit further comprises a nonlinear regression model algorithm engine unit for detecting a signal having a good possibility that a mine and an explosive is capable of being present from a soil signal and noise by the intensity of a signal detected in the received super high-frequency RF radiation beam and the neutron technique is exponentially attenuated depending on a depth in which the signal is transmitted and received.

3. The smart wearable mine detector of claim 1, wherein the human body antenna unit is protruded in a circular fan shape.

4. The smart wearable mine detector of claim 1, wherein the main microprocessor unit comprises a detection signal analysis algorithm engine unit for analyzing the detection data of the mine by comparing the detection data with predetermined reference detection modeling and computing the distance, location, form, material, and topography of the mine in a 2D or 3D manner.

5. The smart wearable mine detector of claim 1, further comprising a body-mounted LCD monitor unit detachably installed on the body, for displaying the 2D/3D display data of the distance, location, form, and material of the mine, the GPS location information data received from the main microprocessor unit on an LCD screen.

6. The smart wearable mine detector of claim 1, further comprising a wireless data transmission and reception unit connected to a remote battle command server over a Wi-Fi wireless communication network, for performing bidirectional data communication.

* * * * *